(12) United States Patent
Matsuyama

(10) Patent No.: US 11,655,392 B2
(45) Date of Patent: May 23, 2023

(54) COATING COMPOSITION, DECORATIVE FILM AND DECORATIVE MOLDED ARTICLE

(71) Applicant: DAINICHISEIKA COLOR & CHEMICALS MFG. CO., LTD., Tokyo (JP)

(72) Inventor: Nobuya Matsuyama, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 17/605,116

(22) PCT Filed: May 7, 2020

(86) PCT No.: PCT/JP2020/018527
§ 371 (c)(1),
(2) Date: Oct. 20, 2021

(87) PCT Pub. No.: WO2020/235345
PCT Pub. Date: Nov. 26, 2020

(65) Prior Publication Data
US 2022/0145123 A1 May 12, 2022

(30) Foreign Application Priority Data
May 23, 2019 (JP) .............................. JP2019-096663

(51) Int. Cl.
| | | |
|---|---|---|
| C09D 175/14 | (2006.01) | |
| C09D 7/61 | (2018.01) | |
| C09D 7/40 | (2018.01) | |
| C08G 18/32 | (2006.01) | |
| C08G 18/34 | (2006.01) | |
| C08G 18/61 | (2006.01) | |
| C08G 18/65 | (2006.01) | |
| C08G 18/75 | (2006.01) | |
| C08G 18/67 | (2006.01) | |
| C08J 7/04 | (2020.01) | |
| C09D 175/16 | (2006.01) | |
| C09D 5/00 | (2006.01) | |
| C08G 18/24 | (2006.01) | |
| C08J 7/046 | (2020.01) | |
| C08K 3/22 | (2006.01) | |

(52) U.S. Cl.
CPC ......... *C09D 175/14* (2013.01); *C08G 18/246* (2013.01); *C08G 18/3206* (2013.01); *C08G 18/348* (2013.01); *C08G 18/61* (2013.01); *C08G 18/6511* (2013.01); *C08G 18/6517* (2013.01); *C08G 18/6541* (2013.01); *C08G 18/672* (2013.01); *C08G 18/673* (2013.01); *C08G 18/755* (2013.01); *C08J 7/046* (2020.01); *C08J 7/0427* (2020.01); *C09D 5/00* (2013.01); *C09D 7/61* (2018.01); *C09D 7/67* (2018.01); *C09D 175/16* (2013.01); *C08J 2333/12* (2013.01); *C08J 2367/02* (2013.01); *C08J 2475/16* (2013.01); *C08K 2003/2227* (2013.01); *C08K 2201/003* (2013.01)

(58) Field of Classification Search
CPC .......... C09D 175/14; C09D 7/61; C09D 7/67; C09D 5/00; C09D 175/16; C08G 18/3206; C08G 18/348; C08G 18/61; C08G 18/6511; C08G 18/6541; C08G 18/755; C08G 18/246; C08G 18/6517; C08G 18/672; C08G 18/673; C08K 2003/2227; C08K 2201/003; C08F 290/067; C08J 7/0427; C08J 7/046; C08J 2333/12; C08J 2367/02; C08J 2475/16
See application file for complete search history.

(56) References Cited

FOREIGN PATENT DOCUMENTS

| | | | | |
|---|---|---|---|---|
| JP | 57-126819 | 8/1982 | | |
| JP | 10-058895 | 3/1998 | | |
| JP | 3233595 | 11/2001 | | |
| JP | 2006-045504 | 2/2006 | | |
| JP | 2006045504 A | * | 2/2006 | ............ C08F 283/12 |
| JP | 2008-208154 | 9/2008 | | |
| JP | 2008-280456 | 11/2008 | | |

(Continued)

OTHER PUBLICATIONS

International Search Report, issued in the corresponding PCT application No. PCT/JP2020/018527, dated Jul. 7, 2020, 5 pages (including translation).

*Primary Examiner* — Rabon A Sergent
(74) *Attorney, Agent, or Firm* — Hamre. Schumann, Mueller & Larson, P.C.

(57) ABSTRACT

The present invention provides an ionizing radiation curable paint composition which is capable of forming a cured film that has excellent elongation (for example, 30% or more) under heating and has excellent solvent resistance and chemical resistance and which can contain an alcohol as a diluent solvent. The ionizing radiation curable paint composition contains a urethane (meth)acrylate oligomer (A1) having 6 or more (meth)acryloyl groups and having a weight average molecular weight of 3,000 to 50,000, wherein the urethane (meth)acrylate oligomer (A1) is a silicone-modified oligomer having a constituent unit (a) derived from a multifunctional (meth)acrylate monomer having a hydroxy group and 3 or more (meth)acryloyl groups, a constituent unit (b) derived from an alcohol having 2 or more hydroxy groups and having a molecular weight of 100 or lower, a constituent unit (c) derived from isophorone diisocyanate, and a constituent unit (d) derived from a carbinol-modified polysiloxane.

6 Claims, No Drawings

(56) References Cited

FOREIGN PATENT DOCUMENTS

| | | |
|---|---|---|
| JP | 2011-148964 | 8/2011 |
| JP | 5151179 | 2/2013 |
| JP | 2013-173927 | 9/2013 |
| JP | 2016-060839 | 4/2016 |
| JP | 2016-186039 | 10/2016 |
| JP | 2018-111793 | 7/2018 |
| JP | 2018111793 A * | 7/2018 |
| WO | 2016/159294 | 10/2016 |

* cited by examiner

COATING COMPOSITION, DECORATIVE FILM AND DECORATIVE MOLDED ARTICLE

TECHNICAL FIELD

The present invention relates to an ionizing radiation curable paint composition, and a decorative film and a decorative shaped article each using this paint composition.

BACKGROUND ART

Demand for a decorative film as a material for forming the interior or exterior of a vehicle has been increasing. Under such circumstances, having satisfactory hardness properties and excellent weatherability and chemical resistance are taken as important for a decorative film, and therefore a paint composition that does not cause yellowing and is of an ionizing radiation curable type has generally been used for a protective film for the film.

Decorative films are usually manufactured by various shaping methods, such as film insert molding and in-mold molding. However, with divergence of the shapes of articles to be decorated, having flexibility and stretchability in a heat shaping process (under a temperature condition of several tens ° C. or higher) (hereinafter, also referred to as "elongation under heating") is required in decorative films. Therefore, having elongation under heating is also required in a protective film for a decorative film.

To achieve both the chemical resistance and the elongation under heating, for example, a method of forming a protective film with an uncured or semi-cured film and curing the protective film completely after shaping has been proposed (Patent Literature 1). Moreover, a method of allowing a resin composition for forming a protective film to contain a component such as an isocyanate or an amine in advance and curing a curing failure part completely by heating has been proposed (Patent Literature 2). Further, a method of blending a thermoplastic resin in an ionizing radiation curable paint composition (Patent Literature 3) and a film for shaping provided with a hard coat layer in which the crosslinking density has been controlled by setting the formulation of components such as monomers (Patent Literature 4) have been proposed.

Furthermore, an active energy ray curable composition containing a urethane acrylate oligomer having a particular composition, and a film having a cured film formed by curing this composition have been proposed (Patent Literatures 5 and 6).

CITATION LIST

Patent Literature

Patent Literature 1: Japanese Patent No. 3233595
Patent Literature 2: Japanese Patent Laid-Open No. 57-126819
Patent Literature 3: Japanese Patent No. 5151179
Patent Literature 4: Japanese Patent Laid-Open No. 2011-148964
Patent Literature 5: Japanese Patent Laid-Open No. 2016-186039
Patent Literature 6: Japanese Patent Laid-Open No. 2018-111793

SUMMARY OF INVENTION

Technical Problem

However, with respect to the method proposed in Patent Literature 1, a manufacturer who performs shaping does not necessarily have a curing apparatus, and therefore the method may somewhat lack versatility, and a part which is not irradiated sufficiently with the active energy ray is present in some cases depending on the shape of an article to be decorated, and therefore a curing failure is likely to occur in some cases.

Moreover, with respect to the method proposed in Patent Literature 2, the pot life of the resin composition is likely to be short, and unevenness is likely to occur in the final physical properties in some cases. Further, with respect to the film and the like proposed in Patent Literatures 3 to 6, it cannot necessarily be said that the chemical resistance is sufficient.

Note that a resin material, such as poly (methyl methacrylate) (PMMA) and polycarbonate (PC), is used for the base material for forming the interior or exterior of a vehicle in many cases. However, these resin materials have low solvent resistance, and therefore an alcohol that is unlikely to bring about deterioration or the like in a base material needs to be used as a diluent solvent for a paint composition for forming a paint film or a cured film to be in contact with the base material composed of any of these resin materials. However, curable resin components which have been blended in a general paint composition (resin composition) for forming a paint film or a cured film for a decorative film have not necessarily been easily soluble in alcohols.

The present invention has been completed in view of these problems of the conventional techniques, and an object of the present invention is to provide an ionizing radiation curable paint composition which is capable of forming a cured film that has excellent elongation (for example, 30% or more) under heating and has excellent solvent resistance and chemical resistance and which can contain an alcohol as a diluent solvent. Another object of the present invention is to provide a decorative film and a decorative shaped article each obtained using the ionizing radiation curable paint composition.

Solution to Problem

That is, according to the present invention, a paint composition described below is provided.

[1] A paint composition being an ionizing radiation curable paint composition, containing a urethane (meth)acrylate oligomer (A1) having 6 or more (meth)acryloyl groups and having a weight average molecular weight of 3,000 to 50,000, wherein the urethane (meth)acrylate oligomer (A1) is a silicone-modified oligomer having a constituent unit (a) derived from a multifunctional (meth)acrylate monomer having a hydroxy group and 3 or more (meth)acryloyl groups, a constituent unit (b) derived from an alcohol having 2 or more hydroxy groups and having a molecular weight of 100 or lower, a constituent unit (c) derived from isophorone diisocyanate, and a constituent unit (d) derived from a carbinol-modified polysiloxane, a content of the constituent unit (d) in the urethane (meth)acrylate oligomer (A1) is 0.1 to 10% by mass based on a total amount of the constituent units (a) to (c), and a content of the urethane (meth)acrylate oligomer (A1) is 50% by mass or more based on a solid content of paint.

[2] The paint composition according to [1], wherein the carbinol-modified polysiloxane has a weight average molecular weight of 3,000 or lower.

[3] The paint composition according to [1] or [2], wherein the multifunctional (meth)acrylate monomer is at least any one of pentaerythritol tri(meth)acrylate and dipentaerythritol penta(meth)acrylate.

[4] The paint composition according to any one of [1] to [3], wherein the alcohol is at least any one of ethylene glycol and glycerin.

[5] The paint composition according to any one of [1] to [4], further comprising an inorganic filler having an average primary particle diameter of 1 to 100 nm, wherein a content of the inorganic filler is 1 to 50% by mass based on a solid content of paint.

In addition, according to the present invention, a decorative film and a decorative shaped article described below are provided.

[6] A decorative film provided with: a film-like plastic base material; and a cured film obtained by curing a coating film formed with the paint composition according to any one of [1] to [5], the cured film arranged on at least one of the surfaces of the plastic base material.

[7] A decorative shaped article provided with: a shaped article main body made of a resin; and a cured film obtained by curing a coating film formed with the paint composition according to any one of [1] to [5], the cured film arranged on a surface of at least a part of the shaped article main body.

Advantageous Effects of Invention

According to the present invention, an ionizing radiation curable paint composition which is capable of forming a cured film that has excellent elongation (for example, 30% or more) under heating and has excellent solvent resistance and chemical resistance and which can contain an alcohol as a diluent solvent can be provided. In addition, according to the present invention, a decorative film and a decorative shaped article each obtained using this ionizing radiation curable paint composition can be provided.

DESCRIPTION OF EMBODIMENTS

<Paint Composition>

Hereinafter, embodiments of the present invention will be described, but the present invention is not limited to the following embodiments. An ionizing radiation curable paint composition of the present invention contains a urethane (meth)acrylate oligomer (A1) having 6 or more (meth) acryloyl groups and having a weight average molecular weight of 3,000 to 50,000. The content of the urethane (meth)acrylate oligomer (A1) is 30% by mass or more based on the solid content of paint. Hereinafter, the details on the paint composition of the present invention will be described.

(Urethane (Meth)Acrylate Oligomer (A1))

The paint composition contains a urethane (meth)acrylate oligomer (A1) (hereinafter, also simply referred to as "urethane acrylate oligomer") as a resin component. This urethane acrylate oligomer is a so-called silicone-modified oligomer having, in the molecular structure thereof, a constituent unit (d) derived from a carbinol-modified polysiloxane. As just described, the paint composition contains a silicone-modified oligomer in which the silicone component has been incorporated in the molecular structure thereof instead of being simply blended, and therefore a failure, such as bleed-out of the silicone component, is unlikely to occur. In addition, a silicone component to be a water-repellent component can be contained in a paint film and a cured film to be formed, and therefore a paint composition capable of forming a paint film and a cured film having excellent chemical resistance can be prepared. Further, the paint composition contains a silicone-modified oligomer in which a silicone component has been incorporated in the molecular structure thereof, and therefore it is expected that a paint film and a cured film having improved sliding properties and scratch resistance can be formed.

The urethane acrylate oligomer is an oligomer having 6 or more (meth)acryloyl groups in the molecular structure thereof. By using the urethane acrylate oligomer having 6 or more (meth)acryloyl groups, a paint composition capable of forming a cured film having excellent solvent resistance and chemical resistance can be prepared.

The urethane acrylate oligomer has a weight average molecular weight of 3,000 to 50,000 and preferably 4,000 to 40,000. By using the urethane acylate oligomer having a weight average molecular weight within the range, a paint composition capable of forming a cured film having elongation (for example, 30% or more) under heating and having excellent solvent resistance and chemical resistance can be prepared. Note that the weight average molecular weight in the present specification refers to a value in terms of polystyrene, measured by gel permeation chromatography (GPC).

The content of the urethane acrylate oligomer in the paint composition is 30% by mass or more and preferably 50 to 100% by mass based on the solid content of paint. When the content of the urethane acrylate oligomer based on the solid content of paint is too small, the solvent resistance and the chemical resistance of the cured film to be formed are deteriorated, and the tack-free property is deteriorated because the cured films, when coming into contact, easily stick to each other.

[Constituent Unit (a)]

The urethane acrylate oligomer has a constituent unit (a) derived from a multifunctional (meth)acrylate monomer having a hydroxy group and 3 or more (meth)acryloyl groups. Due to having this constituent unit (a), the urethane acrylate oligomer having 6 or more (meth)acryloyl groups can be prepared. The multifunctional (meth)acrylate monomer that forms the constituent unit (a) is preferably at least any one of pentaerythritol tri(meth)acrylate and dipentaerythritol penta(meth)acrylate.

[Constituent Unit (b)]

The urethane acrylate oligomer has a constituent unit (b) derived from an alcohol having two or more hydroxy groups and having a molecular weight of 100 or lower. The alcohol that forms this constituent unit (b) is a so-called short-chain alcohol. Due to having such a constituent unit (b) derived from the short-chain alcohol, the urethane acrylate oligomer having a structure in which constituent units (C) derived from isophorone diisocyanate, which will be mentioned later, are repeated densely and consecutively can be prepared. The urethane acrylate oligomer having such a structure is easily soluble to alcohols. Further, by using the urethane acrylate oligomer having such a structure, a paint composition capable of forming a cured film having excellent solvent resistance and chemical resistance can be prepared, and a tack-free property of the cured film can be improved. Note that the alcohol that forms the constituent unit (b) is preferably at least any one of ethylene glycol and glycerin.

[Constituent Unit (c)]

The urethane acrylate oligomer has a constituent unit (c) derived from isophorone diisocyanate. By using the urethane acrylate oligomer having this constituent unit (c), a paint composition capable of forming a cured film having excellent solvent resistance and chemical resistance can be prepared. Note that when an aliphatic polyisocyanate, such as hexamethylene diisocyanate (HDI), is used in place of isophorone diisocyanate, which is an alicyclic polyisocyanate, the crystallinity of the urethane acrylate oligomer is too high, and, to begin with, synthesizing the urethane acrylate oligomer is likely to be difficult. In addition, when an aromatic polyisocyanate is used, the weatherability (light resistance) of a cured film to be formed is deteriorated.

[Constitutional Unit (d)]

The urethane acrylate oligomer has a constituent unit (d) derived from a carbinol-modified polysiloxane. Examples of the carbinol-modified polysiloxane include a compound represented by the following formula (1).

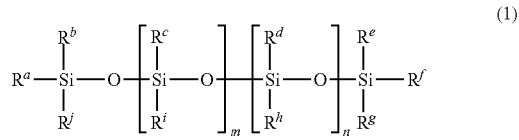

(1)

In formula (1), $R^a$ to $R^j$ each independently represent a C1-8 alkyl group, a C1-8 alkoxy group, or a group represented by $—R^k—OH$ (wherein $R^k$ represents an alkylene group). However, at least one of $R^a$ to $R^j$ is a group represented by $—R^k—OH$. m and n each independently represent 0 or a positive integer (however, m+n 1). Note that $R^a$ to $R^j$ may form a cyclic structure by mutually bonding to each other.

The carbinol-modified polysiloxane which is a commercially available product, a newly synthesized product, or the like can be used. From the viewpoint of compatibility, viscosity, and the like, the carbinol-modified polysiloxane preferably has a weight average molecular weight of 10,000 or lower, and more preferably 3,000 or lower.

(Solvent)

The paint composition can further contain a solvent, such as an organic solvent. That is, the urethane acrylate oligomer can be used in a state where it is dissolved in and diluted with a proper organic solvent. Examples of the organic solvent include esters, such as ethyl acetate, propyl acetate, butyl acetate, and propylene glycol monomethyl ether acetate; ketones, such as acetone, methyl ethyl ketone, methyl isobutyl ketone, and anone; hydrocarbons, such as benzene, toluene, xylene, and normal hexane; alcohols, such as ethyl alcohol, isopropyl alcohol, n-butyl alcohol, and propylene glycol monomethyl ether; and glycol ethers, such as propylene glycol monomethyl ether, and butyl cellosolve. When coating a base material having low solvent resistance, an influence on a member or the like to be brought into contact with a cured film to be formed, mixing with another resin component, and the like are taken into consideration, the organic solvent is preferably an alcohol, and more preferably propylene glycol monomethyl ether, among others.

(Inorganic Filler)

The paint composition may further contain an inorganic filler. When the paint composition contains an inorganic filler, physical properties, such as abrasion resistance, of a cured film to be formed can be improved. For example, a fine particle of alumina, nano-silica, or the like can be used as the inorganic filler. Among others, an alumina fine particle is preferably used. From the viewpoint of dispersibility and transparency, the inorganic filler preferably has an average primary particle diameter of 1 to 100 nm and more preferably 50 nm or smaller. The content of the inorganic filler in the paint composition is preferably set to 1 to 50% by mass based on the solid content of paint. The "average primary particle diameter" in the present specification means a 50% cumulative value (D50) in the particle diameter distribution on a volume basis. Note that the particle diameter distribution of a particle can be measured using a laser diffraction particle size distribution measurement apparatus.

(Other Components)

If necessary, the paint composition can further contain a curable resin component having an ethylenically unsaturated double bond, such as a (meth)acrylate polymer, a (meth)acrylate oligomer, or a (meth)acrylate monomer, the curable resin component having a number of functional groups or a structure which is different from the urethane acrylate oligomer. Further, besides the above-described curable resin component, the paint composition can contain any of various curable components having an ethylenically unsaturated double bond. Examples of such a curable component include an acrylic (meth)acrylate having an acrylic equivalent of 150 g/eq or more, a urethane (meth)acrylate oligomer having a (meth)acryloyl group, a polyester(meth)acrylate oligomer, an epoxy (meth)acrylate oligomer, and a (meth)acrylate monomer.

The paint composition can contain a photopolymerization initiator. Examples of the photopolymerization initiator include 2,2-dimethoxy-1,2-diphenylethan-1-one, 1-cyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-1-butanone, bis(2,4,6-trimethylbenzoyl)-phenylphosphine oxide, 2,4,6-trimethylbenzoyl-diphenyl-phosphine oxide, and 4-methylbenzophenone. Note that a known curing accelerator may be used together with the photopolymerization initiator. The amount of the photopolymerization initiator is preferably set to 3 to 10 parts by mass based on 100 parts by mass of the curable resin component including the urethane acrylate oligomer.

The paint composition can contain any of various additives. Examples of the additive include a silane coupling agent, a levelling agent, a defoaming agent, an antioxidizing agent, a thermoplastic resin, an anti-static agent, wax, a heat stabilizer, a flame retardant, an air fresher, an ultraviolet ray absorber (UVA), a radical scavenger (HALS), and a surfactant. The paint composition preferably contains an ultraviolet ray absorber or a radical scavenger because the weatherability of a cured film to be formed can further be improved. Further, the paint composition preferably contains a silicone-based surfactant or a fluorine-based surfactant because the solvent resistance and the antifouling property of a cured film to be formed can be improved.

<Decorative Film>

By using the previously mentioned paint composition, a decorative film suitable for decorating various shaped articles for the interior or exterior of vehicles, and the like can be obtained. That is, the decorative film of the present invention is provided with a film-like plastic base material, and a cured film obtained by curing a coating film formed with the previously mentioned paint composition, the cured film arranged on at least one of the surfaces of this plastic base material.

Examples of the plastic (resin) for forming the plastic base material include poly(methyl methacrylate) (PMMA), polycarbonate (PC), polybutylene terephthalate (PBT), polyphenylene sulfide (PPS), a modified polyphenylene ether (modified PPE), polyethylene terephthalate (PET), triacetyl cellulose (TAC), and a cycloolefin polymer (COP). Among these, PMMA and PC are preferable for application to the decoration of the interior or exterior of vehicles. The plastic base material is also preferably a laminated film.

From the viewpoint of operability, processability, and the like, the film-like plastic base material preferably has a thickness of 25 to 500 m.

The surface of the plastic base material, where the paint composition is to be applied (the surface on which a cured film is to be arranged), is preferably surface-treated for the purpose of improving the adhesiveness with the paint composition. Examples of the surface treatment include surface-roughening treatments, such as a primer treatment, a sand-blast treatment, and a solvent treatment; and oxidation treatments, such as a corona discharge treatment, a chromic acid treatment, and ozone/ultraviolet ray radiation treatment. On the other hand, when the decorative film is used for in-mold transfer, the surface of the plastic base material is preferably subjected to a mold release treatment with a melamine resin, a silicone resin, or a fluorine resin or the like for the purpose of improving the releasability between the plastic base material and the paint composition.

The decorative film can be produced according to a conventionally known method. For example, a coating film is formed by applying the paint composition on the surface of the plastic base material by a known coating method, such as a roll coat method, a gravure coat method, a comma coat method, a knife coat method, a die coat method, and a screen coat method. Subsequently, the coating film formed is irradiated with a predetermined dose of an ultraviolet ray or an electron beam to cure the coating film and form a cured film, and thus the decorative film can be obtained. As an apparatus for irradiating the coating film with an ultraviolet ray or an electron beam, known ultraviolet ray irradiation apparatuses and electron beam irradiation apparatuses, such as a xenon lamp, a metal halide lamp, a high-pressure mercury lamp, a low-pressure mercury lamp, an electrode-less lamp, a LED lamp, a xenon flash lamp, and an excimer lamp, can be used.

The thicknesses of the coating film and the cured film may appropriately be set according to the application. Specifically, the thicknesses of the coating film and the cured film are usually set to 100 nm to 10 m and preferably 3 to 5 m. Note that by further arranging a low-refractive-index layer having a thickness of around 100 nm by lamination, a decorative film having a reflection prevention effect can also be prepared.

<Decorative Shaped Article>

By using the decorative film produced using the previously mentioned paint composition or this paint composition, various decorative shaped articles can be obtained. That is, the decorative shaped article of the present invention is provided with: a shaped article main body made of a resin; and a cured film obtained by curing a coating film formed with the previously mentioned paint composition, the cured film arranged on the surface of at least a part of this shaped article main body.

As mentioned previously, the paint composition of the present invention is a material capable of forming a cured film which has excellent elongation under heating and has excellent solvent resistance and chemical resistance. Therefore, the decorative shaped article provided with a cured film obtained by curing a coating film formed with this paint composition has, at least a part of the surface thereof, a cured film having excellent elongation under heating, solvent resistance, and chemical resistance. Specific examples of the decorative shaped article having such characteristics include applications to the interior or exterior of vehicles, the building materials for interior or exterior, home electric appliances, and mobile devices.

EXAMPLES

Hereinafter, the present invention will be described specifically based on Examples, but the present invention is not limited to these Examples. Note that "parts" and "%" in Examples and Comparative Examples are on a mass basis unless otherwise noticed.

<Production of Acrylate Oligomer>
(Urethane Acrylate Oligomer A)

In a three-necked flask, 1,696 parts of pentaerythritol triacrylate, 420 parts of ethylene glycol, 120 parts of a carbinol-modified polysiloxane (molecular weight 1,000), 4 parts of dibutyltin laurate, 8 parts of 2,6-tert-butyl-4-methylphenol (BHT), and 4,000 parts of propyl acetate were charged. A resultant mixture was stirred uniformly, and 1,883 parts of isophorone diisocyanate was then put therein controlling the temperature at 60° C. Thereafter, a resultant mixture was stirred at 70° C. for 15 hours to complete the reaction and obtain a solution (solid content 50%) of urethane acrylate oligomer A (hexafunctional) having a weight average molecular weight of 5,000. The content of the constituent unit (d) in urethane acrylate oligomer A obtained was 3.0% based on the total amount of the constituent units (a) to (c). In addition, urethane acrylate oligomer A obtained was soluble to alcohols, such as propylene glycol monomethyl ether.

(Urethane Acrylate Oligomer B)

In a three-necked flask, 2,328 parts of pentaerythritol triacrylate, 262 parts of ethylene glycol, 120 parts of a carbinol-modified polysiloxane (molecular weight 1,000), 4 parts of dibutyltin laurate, 8 parts of BHT, and 4,000 parts of propyl acetate were charged. A resultant mixture was stirred uniformly, and 1,410 parts of isophorone diisocyanate was then put therein controlling the temperature at 60° C. Thereafter, a resultant mixture was stirred at 70° C. for 15 hours to complete the reaction and obtain a solution (solid content 50%) of urethane acrylate oligomer B (hexafunctional) having a weight average molecular weight of 3,000. The content of the constituent unit (d) in urethane acrylate oligomer B obtained was 3.0% based on the total amount of the constituent units (a) to (c). In addition, urethane acrylate oligomer B obtained was soluble to alcohols, such as propylene glycol monomethyl ether.

(Urethane Acrylate Oligomer C)

In a three-necked flask, 1,163 parts of pentaerythritol triacrylate, 393 parts of ethylene glycol, 96 parts of a carbinol-modified polysiloxane (molecular weight 1,000), 4 parts of dibutyltin laurate, 8 parts of BHT, and 4,800 parts of propyl acetate were charged. A resultant mixture was stirred uniformly, and 1,643 parts of isophorone diisocyanate was then put therein controlling the temperature at 60° C. Thereafter, a resultant mixture was stirred at 70° C. for 15 hours to complete the reaction and obtain a solution (solid content 40%) of urethane acrylate oligomer C (hexafunctional) having a weight average molecular weight of 7,000.

The content of the constituent unit (d) in urethane acrylate oligomer C obtained was 3.0% based on the total amount of the constituent units (a) to (c). In addition, urethane acrylate oligomer C obtained was soluble to alcohols, such as propylene glycol monomethyl ether.

(Urethane Acrylate Oligomer D)

A solution (solid content 40%) of urethane acrylate oligomer D (decafunctional) having a weight average molecular weight of 6,000 was obtained in the same manner as in the previously mentioned case of urethane acrylate oligomer A, except that dipentaerythritol pentaacrylate was used in place of pentaerythritol triacrylate. The content of the constituent unit (d) in urethane acrylate oligomer D obtained was 3.0% based on the total amount of the constituent units (a) to (c). In addition, urethane acrylate oligomer D obtained was soluble to alcohols, such as propylene glycol monomethyl ether.

(Urethane Acrylate Oligomer E)

In a three-necked flask, 1,284 parts of pentaerythritol triacrylate, 290 parts of ethylene glycol, 72 parts of glycerin, 96 parts of a carbinol-modified polysiloxane (molecular weight 1,000), 4 parts of dibutyltin laurate, 8 parts of BHT, and 4,800 parts of propyl acetate were charged. A resultant mixture was stirred uniformly, and 1,555 parts of isophorone diisocyanate was then put therein controlling the temperature at 60° C. Thereafter, a resultant mixture was stirred at 70° C. for 15 hours to complete the reaction and obtain a solution (solid content 40%) of urethane acrylate oligomer E (nonafunctional) having a weight average molecular weight of 37,000. The content of the constituent unit (d) in urethane acrylate oligomer E obtained was 3.1% based on the total amount of the constituent units (a) to (c). In addition, urethane acrylate oligomer E obtained was soluble to alcohols, such as propylene glycol monomethyl ether.

(Urethane Acrylate Oligomer F)

A solution (solid content 40%) of urethane acrylate oligomer F (hexafunctional) having a weight average molecular weight of 7,000 was obtained in the same manner as in the previously mentioned case of urethane acrylate oligomer C, except that the carbinol-modified polysiloxane was not used. The constituent unit (d) is not contained in urethane acrylate oligomer F obtained. In addition, urethane acrylate oligomer F obtained was soluble to alcohols, such as propylene glycol monomethyl ether.

(Urethane Acrylate Oligomer G)

A solution (solid content 40%) of urethane acrylate oligomer G (decafunctional) having a weight average molecular weight of 6,000 was obtained in the same manner as in the previously mentioned case of urethane acrylate oligomer D, except that the carbinol-modified polysiloxane was not used. The constituent unit (d) is not contained in urethane acrylate oligomer G obtained. In addition, urethane acrylate oligomer G obtained was soluble to alcohols, such as propylene glycol monomethyl ether.

(Urethane Acrylate Oligomer H)

In a three-necked flask, 633 parts of hydroxyethyl acrylate, 615 parts of ethylene glycol, 120 parts of a carbinol-modified polysiloxane (molecular weight 1,000), 4 parts of dibutyltin laurate, 8 parts of BHT, and 4,000 parts of propyl acetate were charged. A resultant mixture was stirred uniformly, and 2,751 parts of isophorone diisocyanate was then put therein controlling the temperature at 60° C. Thereafter, a resultant mixture was stirred at 70° C. for 15 hours to complete the reaction and obtain a solution (solid content 50%) of urethane acrylate oligomer H (difunctional) having a weight average molecular weight of 3,000. The content of the constituent unit (d) in urethane acrylate oligomer H obtained was 3.0% based on the total amount of the constituent units (a) to (c). In addition, urethane acrylate oligomer H obtained was soluble to alcohols, such as propylene glycol monomethyl ether.

(Urethane Acrylate Oligomer I)

In a three-necked flask, 1,454 parts of pentaerythritol triacrylate, 492 parts of ethylene glycol, 120 parts of a carbinol-modified polysiloxane (molecular weight 1,000), 4 parts of dibutyltin laurate, 8 parts of BHT, and 4,000 parts of acryloyl morpholine (ACMO, manufactured by KJ Chemicals Corporation) were charged. A resultant mixture was stirred uniformly, and 2,054 parts of isophorone diisocyanate was then put therein controlling the temperature at 60° C. Thereafter, a resultant mixture was stirred at 70° C. for 15 hours to complete the reaction and obtain a solution (solid content 100% (solventless)) of urethane acrylate oligomer I (hexafunctional) having a weight average molecular weight of 7,700. This urethane acrylate oligomer I contains urethane acrylate oligomer C in an amount of 50%. The content of the constituent unit (d) in urethane acrylate oligomer I obtained was 3.0% based on the total amount of the constituent units (a) to (c). In addition, urethane acrylate oligomer I obtained was soluble to alcohols, such as propylene glycol monomethyl ether.

<Preparation of Paint Composition and Preparation of Decorative Film (Test Piece)>

Example 1

Mixed were 100 parts of the solution (solid content 50%) of urethane acrylate oligomer A, 4 parts of a photopolymerization initiator (1-hydroxycyclohexyl phenyl ketone, trade name "Irgacure 184," manufactured by BASF Japan Ltd.), and 5 parts (in terms of alumina) of an alumina fine particle dispersion liquid (trade name "NANOBYK-3610," manufactured by BYK Japan KK, solid content 37%). A resultant mixture was diluted by adding propylene glycol monomethyl ether (PGME) to obtain a paint composition having a solid content of paint of 25%. With the obtained paint composition, each of (i) an easily shapable PET film (manufactured by DuPont Kabushiki Kaisha Films) having a thickness of 25 km and (ii) a PMMA film (manufactured by Mitsubishi Chemical Corporation) having a thickness of 75 μm was coated using a wire bar in such a way as to make the film thickness after drying 3 m. Drying was performed with a dryer of 100° C. for 40 seconds, and curing was then performed with an 80 W/cm high-pressure mercury lamp under a condition of about 300 mJ/cm$^2$ to form cured films and obtain two types of test pieces (decorative films).

Example 2

A paint composition having a solid content of paint of 25% was obtained in the same manner as in the previously mentioned case of Example 1, except that the solution of urethane acrylate oligomer B was used in place of the solution of urethane acrylate oligomer A. Two types of test pieces (decorative films) were obtained in the same manner as in the previously mentioned case of Example 1, except that the obtained paint composition was used.

Example 3

A paint composition having a solid content of paint of 25% was obtained in the same manner as in the previously mentioned case of Example 1, except that the solution of urethane acrylate oligomer C was used in place of the solution of urethane acrylate oligomer A. Two types of test pieces (decorative films) were obtained in the same manner as in the previously mentioned case of Example 1, except that the obtained paint composition was used.

Example 4

A paint composition having a solid content of paint of 25% was obtained in the same manner as in the previously mentioned case of Example 1, except that the solution of urethane acrylate oligomer D was used in place of the solution of urethane acrylate oligomer A. Two types of test pieces (decorative films) were obtained in the same manner as in the previously mentioned case of Example 1, except that the obtained paint composition was used.

Example 5

A paint composition having a solid content of paint of 25% was obtained in the same manner as in the previously mentioned case of Example 1, except that the solution of urethane acrylate oligomer E was used in place of the solution of urethane acrylate oligomer A. Two types of test pieces (decorative films) were obtained in the same manner as in the previously mentioned case of Example 1, except that the obtained paint composition was used.

Example 6

A paint composition having a solid content of paint of 25% was obtained in the same manner as in the previously mentioned case of Example 3, except that a UV-reactive silicone-based additive (trade name "BYK-UV3500," manufactured by BYK Japan KK) was further used in an amount of 0.2% in terms of the solid content ratio to the amount of urethane acrylate oligomer C. Two types of test pieces (decorative films) were obtained in the same manner as in the previously mentioned case of Example 1, except that the obtained paint composition was used.

Reference Example 7

A paint composition having a solid content of paint of 25% was obtained in the same manner as in the previously mentioned case of Example 1, except that a solution containing urethane acrylate oligomer I and ACMO (urethane acrylate oligomer I:ACMO=65:35 (mass ratio)) was used in place of the solution of urethane acrylate oligomer A. The content of urethane acrylate oligomer C in the solid content of paint in the obtained paint composition was 30% or more. Two types of test pieces (decorative films) were obtained in the same manner as in the previously mentioned case of Example 1, except that the obtained paint composition was used.

Comparative Example 1

A paint composition having a solid content of paint of 25% was obtained in the same manner as in the previously mentioned case of Example 1, except that the solution of urethane acrylate oligomer F was used in place of the solution of urethane acrylate oligomer A. Two types of test pieces (decorative films) were obtained in the same manner as in the previously mentioned case of Example 1, except that the obtained paint composition was used.

Comparative Example 2

A paint composition having a solid content of paint of 25% was obtained in the same manner as in the previously mentioned case of Example 1, except that the solution of urethane acrylate oligomer G was used in place of the solution of urethane acrylate oligomer A. Two types of test pieces (decorative films) were obtained in the same manner as in the previously mentioned case of Example 1, except that the obtained paint composition was used.

Comparative Example 3

A paint composition having a solid content of paint of 25% was obtained in the same manner as in the previously mentioned case of Example 1, except that the solution of urethane acrylate oligomer H was used in place of the solution of urethane acrylate oligomer A. Two types of test pieces (decorative films) were obtained in the same manner as in the previously mentioned case of Example 1, except that the obtained paint composition was used.

Comparative Example 4

A paint composition having a solid content of paint of 25% was obtained in the same manner as in the previously mentioned Example 1, except that a solution of acrylic acrylate (double bond equivalent 260 g/eq, weight average molecular weight 30,000) was used in place of the solution of urethane acrylate oligomer A. Two types of test pieces (decorative films) were obtained in the same manner as in the previously mentioned case of Example 1, except that the obtained paint composition was used.

Comparative Example 5

A paint composition having a solid content of paint of 25% was obtained in the same manner as in the previously mentioned case of Example 1, except that a solution of acrylic acrylate (double bond equivalent 830 g/eq, weight average molecular weight 30,000) was used in place of the solution of urethane acrylate oligomer A. Two types of test pieces (decorative films) were obtained in the same manner as in the previously mentioned case of Example 1, except that the obtained paint composition was used.

Comparative Example 6

A paint composition having a solid content of paint of 25% was obtained in the same manner as in the previously mentioned case of Comparative Example 1, except that a UV-reactive silicone-based additive (trade name "BYK-UV3500," manufactured by BYK Japan KK) was further used in an amount of 0.2% in terms of the solid content ratio to the amount of urethane acrylate oligomer F. Two types of test pieces (decorative films) were obtained in the same manner as in the previously mentioned case of Example 1, except that the obtained paint composition was used.

Comparative Example 7

A paint composition having a solid content of paint of 25% was obtained in the same manner as in the previously mentioned case of Example 1, except that a solution containing urethane acrylate oligomer I and ACMO (urethane acrylate oligomer I:ACMO=50:50 (mass ratio)) was used in place of the solution of urethane acrylate oligomer A. The content of urethane acrylate oligomer C in the solid content of paint in the obtained paint composition was less than 30%. Two types of test pieces (decorative films) were obtained in the same manner as in the previously mentioned case of Example 1, except that the obtained paint composition was used.

<Evaluation>

(1) Appearance

The appearances (color/compatibility) of the cured films were observed visually and evaluated on a scale of 1 to 5 (Poor 1→ . . . →5 Good). Table 1 shows the evaluation results.

(2) Tack-Free Property

The two test pieces were placed in such a way as to bring the cured films into contact with each other and left to stand with a load of 10 kg for 30 seconds. The tack-free property was evaluated according to the evaluation criteria described below. Table 1 shows the results.

Good: Sticking does not occur.

Fair: It takes some time until the cured films peel off, but there is no abnormality on the contact surfaces.

Poor: The cured films do not peel off, or abnormality occurs on the contact surfaces.

(3) Elongation Under Heating

Tensile tests were conducted using a tensile tester (trade name "AGS-X," manufactured by Shimadzu Corporation) to evaluate the elongation under heating for the cured films. Specifically, each of the test pieces (10 mm in width×110 mm in length) prepared using the easily shapable PET film was first set in the tensile tester setting the distance between chucks to 60 mm. Subsequently, the test piece was pulled at a speed of 50 mm/min under a temperature condition of 120° C. to measure the elongation (elongation (%) under heating) until a crack occurred in the cured film, and the elongation was used as an index of the elongation under heating. Note that the elongation at the time when the distance between chucks reached 120 mm was defined as "elongation under heating=100%." Table 1 shows the results of measuring the elongation (%) under heating.

(4) Solvent Resistance

Onto the surfaces of the cured films of the test pieces prepared using the PMMA film, 2 drops of xylene were dropped using a spuit, and the test pieces were left to stand at room temperature for 30 minutes. Subsequently, the surfaces of the cured films were wiped with a dry cloth, and the surfaces of the cured films were observed visually to evaluate the solvent resistance on a scale of 1 to 5 (Poor 1→ . . . →5 Excellent). Table 1 shows the results.

(5) Chemical Resistance

The surfaces of the cured films of the test pieces prepared using the PMMA film were wiped back and forth 20 times with a dry cloth with a load of 1 kg. Thereafter, a cosmetic for skin (trade name "Neutrogena (R)," manufactured by Johnson & Johnson Services, Inc.) was applied with a swab on the surfaces of the cured film, which was wiped with a dry cloth, in such a way as to draw a circle of a dimeter of 30 mm. The test pieces were left to stand in a drier of 80° C. for 6 hours, the surfaces of the cured films were wiped with a dry cloth, and the surfaces of the cured films were observed visually to evaluate the chemical resistance on a scale of 1 to 5 (Poor 1→ →5 Excellent). Table 1 shows the results.

TABLE 1

| | Appearance | Tack-free property | Degree of elongation under heating (%) | Solvent resistance | Chemical resistance |
|---|---|---|---|---|---|
| Base material (PMMA) | — | — | >150 | 1 | 1 |
| Example 1 | Good | Good | 80 | 5 | 5 |
| Example 2 | Good | Good | 35 | 5 | 5 |
| Example 3 | Good | Good | 130 | 4 | 4 |
| Example 4 | Good | Good | 30 | 5 | 5 |
| Example 5 | Good | Good | 80 | 5 | 5 |
| Example 6 | Good | Good | 130 | 5 | 4 |
| Reference Example 7 | Good | Poor | >150 | 4 | 4 |
| Comparative Example 1 | Good | Good | 135 | 3 | 3 |
| Comparative Example 2 | Good | Good | 30 | 4 | 3 |
| Comparative Example 3 | Good | Good | >150 | 2 | 1 |
| Comparative Example 4 | Good | Fair | 15 | 5 | 5 |
| Comparative Example 5 | Good | Good | 80 | 3 | 2 |
| Comparative Example 6 | Good | Good | 130 | 4 | 2 |
| Comparative Example 7 | Good | Poor | >150 | 1 | 1 |

When Examples 1 to 4 are compared with Comparative Examples 1 and 2, it is found that Examples 1 to 4 are superior in terms of chemical resistance. Particularly when the molecular weight of the urethane acrylate oligomer is larger, the cured film has more excellent chemical resistance. It is considered that the elongation under heating and the chemical resistance of the cured films were improved by using the urethane acrylate oligomers each having a structure in which isophorone cyclic structures are repeated in a consecutive manner, and that the chemical (the cosmetic) did not penetrate into the base material by using the urethane acrylate oligomers which are silicone-modified oligomers.

From the evaluation results of Examples 1 to 3, it is found that when the molecular weight of the urethane acrylate oligomer is larger, the elongation under heating is improved more, but the chemical resistance is somewhat deteriorated. However, the urethane acrylate oligomers which are silicone-modified oligomers were used, and therefore the chemical resistance was not deteriorated significantly. Further, from the evaluation results of Example 5, it is found that when the urethane acrylate oligomer having a constituent unit derived from glycerin is used, the chemical resistance is not deteriorated even though the urethane acrylate oligomer has a large molecular weight. It is considered that this is because the urethane acrylate oligomer having a large number of functional groups (acryloyl groups) and having a structure in which isophorone cyclic structures are repeated more densely was used.

From the evaluation results of Comparative Example 3, it is found that when a urethane acrylate oligomer having a small number of functional groups (acryloyl groups) is used, sufficient elongation under heating is exhibited, but the solvent resistance and the chemical resistance are deteriorated remarkably.

When Example 3 and Example 6 are compared, it is found that the solvent resistance was improved by using the silicone-based additive. However, when Example 6 and Comparative Example 6 are compared, it is found that when the UV-reactive silicone-based additive was used without using the urethane acrylate oligomer which is a silicone-modified oligomer, the chemical resistance was deteriorated. It is considered that in Comparative Example 6, the chemical resistance was deteriorated because when the chemical resistance was evaluated, the silicone-based additive on the surface of the cured film was wiped off, and the sliding property was deteriorated, and some scratches occurred by wiping the surface of the cured film with a dry cloth.

When Reference Example 7 and Comparative Example 7 are compared, it is found that the paint composition is cured sufficiently, and effective solvent resistance and chemical resistance are exhibited by allowing the paint composition to contain a certain amount or more of the urethane acrylate oligomer.

INDUSTRIAL APPLICABILITY

The paint composition of the present invention is useful as a material for producing a decorative film or a decorative shaped article.

The invention claimed is:

1. A paint composition being an ionizing radiation curable paint composition, comprising a urethane (meth)acrylate oligomer (A1) having 6 or more (meth)acryloyl groups and having weight average molecular weight in a range from 3,000 to 50,000, wherein
   the urethane (meth)acrylate oligomer (A1) is a silicone-modified oligomer comprising:
      a constituent unit (a) derived from a multifunctional (meth)acrylate monomer having a hydroxy group and 3 or more (meth)acryloyl groups;
      a constituent unit (b) derived from an alcohol having 2 or more hydroxy groups and having a molecular weight of 100 or lower, the alcohol comprising glycerin and ethylene glycol;
      a constituent unit (c) derived from isophorone diisocyanate; and
      a constituent unit (d) derived from a carbinol-modified polysiloxane,
   wherein a content of the constituent unit (d) in the urethane (meth)acrylate oligomer (A1) is in a range from 0.1 to 3.1% by mass relative to a total amount of the constituent units (a), (b), and (c), and
   a content of the urethane (meth)acrylate oligomer (A1) is 50% by mass or more based on a solid content of the paint.

2. The paint composition according to claim 1, wherein the carbinol-modified polysiloxane has weight average molecular weight in a range of 3,000 or lower.

3. The paint composition according to claim 1, wherein the multifunctional (meth)acrylate monomer is at least one monomer selected from the group consisting of pentaerythritol tri(meth)acrylate and dipentaerythritol penta(meth)acrylate.

4. The paint composition according to claim 1, further comprising an inorganic filler having an average primary particle diameter in a range from 1 to 100 nm,
   wherein a content of the inorganic filler is in a range from 1 to 50% by mass based on the solid content of the paint.

5. A decorative film comprising:
   a plastic base material in a shape of a film; and
   a cured film obtained by curing a coating film formed with the paint composition according to claim 1,
   wherein the cured film is formed on at least one of surfaces of the plastic base material.

6. A decorative shaped article comprising:
   a shaped article main body made of a resin; and
   a cured film obtained by curing a coating film formed with the paint composition according to claim 1,
   wherein the cured film is formed on at least a part of a surface of the shaped article main body.

* * * * *